US008829737B2

(12) United States Patent
    Carrillo

(10) Patent No.: US 8,829,737 B2
(45) Date of Patent: Sep. 9, 2014

(54) ELECTRIC NETWORK ARCHITECTURE FOR CONFINED ENVIRONMENTS INCLUDING ELECTRIC POWER SOURCES

(75) Inventor: Jean-Jacques Carrillo, Montauban (FR)

(73) Assignees: Jean-Jacques Carrillo, Montauban (FR); Novatec SA, Montauben (FR)

( * ) Notice: Subject to any disclaimer, the term of this patent is extended or adjusted under 35 U.S.C. 154(b) by 823 days.

(21) Appl. No.: 13/121,772

(22) PCT Filed: Oct. 1, 2009

(86) PCT No.: PCT/FR2009/001173
    § 371 (c)(1),
    (2), (4) Date: Oct. 13, 2011

(87) PCT Pub. No.: WO2010/037935
    PCT Pub. Date: Apr. 8, 2010

(65) Prior Publication Data
    US 2012/0019059 A1    Jan. 26, 2012

(30) Foreign Application Priority Data
    Oct. 1, 2008  (FR) ...................................... 08 05431

(51) Int. Cl.
    *H01H 31/10*   (2006.01)
(52) U.S. Cl.
    USPC ................................ 307/115; 307/18; 307/42
(58) Field of Classification Search
    CPC ............... H02J 1/08; H02J 1/10; H02J 3/005; G05B 9/02
    USPC .............................................. 307/42, 18, 115
    See application file for complete search history.

(56) References Cited

U.S. PATENT DOCUMENTS

| 2003/0216876 A1* | 11/2003 | Premerlani et al. ............. 702/58 |
| 2004/0119454 A1* | 6/2004 | Chang et al. .................. 323/284 |
| 2006/0056124 A1* | 3/2006 | Michalko ........................ 361/62 |
| 2009/0231223 A1* | 9/2009 | Laronda ........................ 343/748 |

FOREIGN PATENT DOCUMENTS

WO    WO 2009052843 A1 *   4/2009

OTHER PUBLICATIONS

Automated Power-Distribution Systyem, NTIS Tech Notes, US Department of Commerce, Springfield, VA, Feb. 1, 1991, pp. 128-129.*
Automated Power-Distribution Systyem, NTIS Tech Notes, US Department of Commerce, Springfield, VA, Jul. 1, 1992, pp. 483-484.*
Paul M. Anderson et al., Automated Power Distribution System Hardware, National Aeronautics and Space Administration, Marshall Space Flight Center, Alabama, Aug. 6, 1989, pp. 579-584.*

* cited by examiner

*Primary Examiner* — Daniel Cavallari
(74) *Attorney, Agent, or Firm* — Young & Thompson

(57) ABSTRACT

An electric network architecture for confined environments, includes: a main network including a plurality of electric wires capable of supplying in parallel electric power along the confined medium to a same load, wherein each wire is protected and can be insulated at each end; a primary distribution assembly including at least one primary distribution subassembly including a selection element connected to at least one of the wires and to a dedicated electric power source; at least one secondary distribution assembly connected to at least a portion of the main network and for powering at least one dedicated load, wherein each secondary distribution assembly includes at least one selection element connected to an output terminal to which an electric load is to be connected, the selection element being capable of closing or opening the electric link established between the output terminal and at least one of the wires of the main network.

13 Claims, 2 Drawing Sheets

ELECTRIC NETWORK ARCHITECTURE FOR CONFINED ENVIRONMENTS INCLUDING ELECTRIC POWER SOURCES

TECHNICAL DOMAIN

This invention is from the field of electrical equipment for confined environments and has as its object a new electrical network architecture incorporating electric power sources for supplying one or more electric loads. More particularly, this invention relates to an electrical network architecture with an improved current occupancy rate, for an aircraft or other transport vehicles, as well as for special use buildings such as hospitals, etc.

PRIOR ART

Typically, known electrical networks for aircraft and others, as shown schematically in FIG. 3, are organized in a tree configuration so that each electrical load C is connected to the electric power source S by several electrical wires arranged in series, forming, for example from the source S, a bulbar B, an arm or sub-bulbar SB and a branch R. These wires are of increasing cross sections from the load C toward the current source S. This is due to the fact that each sub-bulbar SB generally supplies several branches R that each supply a load C and that each bus B supplies several sub-busbars SB.

These electrical power transport paths are linked to means of protection against electrical overcurrents such as certain circuit breakers using SSPC, the acronym of "solid state power controller" (static power interruption element).

DESCRIPTION OF THE INVENTION

Technical Object

The configuration as described above has several major drawbacks.

Transporting power to each load takes only a single path upstream of the output circuit breaker so that a break of one of the wires of this path prevents normal operation of the electric load or loads that are linked to it. This fault is irrelevant to safety if the electric load or loads are not critical for normal operation of the aircraft.

The documents "Automated power distribution system" NTIS Tech Notes, US Department of Commerce, Springfield, Va., US, Feb. 1, 1991 (1991-02-01) page 128, 1,2, XP000224742; US 2006/056124 A1 (Michalko Rodney G [CA]), Mar. 16, 2006 (2006-03-16); US 2003/216876 A1 (Premerlani William James [US] et al) Nov. 20, 2003 (2003-11-20); FR 2 911 847 A (Hispano Suiza Soc [FR]) Aug. 1, 2008 (2008-08-01) and WO 2009/052843 A (Siemens A G [DE]; Blystad Svein [NO]; Van Ravens Rune [NO]) Apr. 30, 2009 (2009-04-30) all make reference to electrical distributions that take only one path at a time and that necessitate a reconfiguration for resupply of the load, or that are supplied by several generators placed in parallel on the network.

The cross section of each wire is determined by the maximum intensity of the consumption peaks that can cross it, whereas these events can only be spot events and can only be produced a limited number of times during the flight as relates to aeronautical use. The remainder of the time, the value of the current intensity could be largely below this peak consumption. This arrangement leads to oversizing of the cabling to take into account the consumption peaks and consequently to increasing the mass of the cabling.

Conventionally the design of an electric power distribution network for a jumbo jet aircraft occupies several teams of engineers full-time for the duration of the program, in installation, in development, in cabling, in certification, in configuration management and in research and development.

With regard to this study, the positioning of the loads in the aircraft, the consumption branch by branch and electric power source by electric power source for each of the flight phases are taken into account. The peak currents, i.e., the consumption peaks, are likewise taken into account.

One study cycle of high recursiveness leads to reassignment of loads for purposes of optimization. Configuration files for the loads and the SSPC's are then established.

The aircraft electrical loads quite often comprise so-called commercial loads that satisfy the wishes and needs of airline companies. A modification or an addition of a load, even commercial, in most cases if this modification has not been foreseen at the start, entails the development of a new configuration file, which this can pose certification problems.

Furthermore, the management of the configuration of multiple optional loads poses major configuration management problems.

Another drawback is due to the fact that for certain structures, especially of composite material, a defect of the insulation between a wire and said structure can very seriously damage the latter because of the release of heat caused by a considerable addition of power.

Finally, the management of actual networks does not allow balancing of the electric power sources with the loads in a dynamic manner.

The only possibility offered by the known networks in case of an overload of the generators is cutoff during use; which proves very inadequate.

Technical Solution

The object of this invention is to solve the aforementioned problems by using a new electrical network architecture for confined environments such as aircraft allowing a significant reduction of the cabling mass.

Another object of this invention is to facilitate the integration of new electric loads without it being necessary to make considerable calculations for optimization of the balancing of the electric loads.

Another object of this invention is to allow a dynamic balancing of the electric power sources during use.

For this purpose, the new electrical network architecture for confined environments such as aircraft is characterized essentially in that it comprises:

a main electrical network composed of several electrical wires that are distinct from one another, each able, in combination with at least one other wire, to simultaneous distribute the electric power originating from the same generator, through a primary distribution assembly, along the confined environment, and through a secondary distribution assembly, to the same output terminal that is designed to supply an electrical load.

a primary distribution assembly comprising at least one primary distribution subassembly composed of a selector means that is connected on the one hand to at least two of the wires of the main electrical network, and on the other hand, to a dedicated electric power source and more especially either to one of the output terminals of the latter on which electric power is potentially available, or to the neutral terminal of this source or to the electric ground terminal, at least one secondary distribution assembly that is connected electrically to at least one part of the primary network, said assembly being designed to supply at least one dedicated load, each secondary distribution assembly comprising at least one selector means that is connected to a single output terminal to which an electric load is designed to be connected, said selector means being able to open or close the electrical connection established between said output electrical terminal and the main electrical network.

Because of these arrangements, performing the installation is greatly simplified and the addition of an unanticipated load from the outset will not pose a particular problem, and this load, as a function of the electric power that it absorbs, will be connected to one or more wires of the main network simultaneously.

The configuration as defined above allows limitation of the intensity of the currents circulating in each wire, which is a safety factor against electrical damage that can be caused to the structure.

In the case of failure of one of the electric power sources and more generally of one of the load supply paths, the linked load will be able to be switched onto one or more other paths and if necessary onto one or more other power sources provided that the latter are compatible with one another.

According to another characteristic of the invention, the selector means of each primary distribution subassembly is composed of several relays comprising a common terminal by which they are connected to the corresponding terminal of the chosen electric power source, each relay being connected moreover to at least one of the wires of the main network, these wires themselves being linked to the same power source or with several sources that are compatible with one another, i.e., with sources that can be placed in parallel to supply a load without the risk of a deterioration of one part of the network and/or of the sources and without risk of malfunctioning.

According to another characteristic of the invention, the selector means of each secondary distribution assembly is composed of several relays connected to the load connection terminal, each relay being connected moreover to one of the wires of the main network.

Advantageously, according to another characteristic of the invention the relays of each primary distribution subassembly and of each secondary distribution assembly are activated in the direction of opening or closing from a controller that is driven by suitable software or by suitable electronics, taking into account the configuration of the loads.

According to another characteristic of the invention, the software or electronics assures the dynamic balancing of the currents in the network and the dynamic balancing of electric power sources by switching of the loads and/or of the electric power sources.

This arrangement makes it possible to dynamically manage the electric power sources as well as the currents and loads.

According to another characteristic of the invention, to each relay is connected in series a protection means against electrical overcurrents.

According to another characteristic, the invention relates to an electrical network architecture for confined environments, characterized in that it comprises:

a main electrical network composed of several electrical wires that are distinct from one another, each able, in combination with at least one other wire, to simultaneously distribute electric power originating from the same generator, through a primary distribution assembly, along the confined environment, and through a secondary distribution assembly to the same output terminal designed to supply an electrical load, a primary distribution assembly comprising at least one primary distribution subassembly composed of a selector means connected on the one hand to at least two of the wires of the main electrical network, and on the other hand to a dedicated electric power source and more especially either to one of the output terminals of the latter on which electrical power is potentially available, or to the neutral terminal of one of the sources or to the electrical ground terminal, at least one secondary distribution assembly connected electrically to at least one part of the main network, said assembly being designed to supply at least one dedicated load, each secondary distribution assembly comprising at least one selector means connected to one output terminal to which an electric load is designed to be connected, said selector means being able to open or close the electrical circuit established between said output electrical terminal and the main electrical network.

According to another characteristic, the invention relates to an architecture characterized in that the selector means of each primary distribution subassembly is composed of several relays comprising one common terminal by which they are connected to the corresponding terminal of the chosen electric power source, each relay being connected moreover to one of the wires of the main electrical network, this wire being specific to said selector.

According to another characteristic, the invention relates to an architecture characterized in that the selector means of each secondary distribution assembly is composed of several relays connected to the load connection terminal, each relay being connected moreover to one of the wires of the main electrical network, this wire being specific to said selector.

SUMMARY DESCRIPTION OF THE FIGURES AND DRAWINGS

Other advantages and characteristics of the invention will become apparent from reading the description of a preferred embodiment given as a nonlimiting example with reference to the attached drawings in which.

EMBODIMENT OF THE INVENTION

Figure 1:
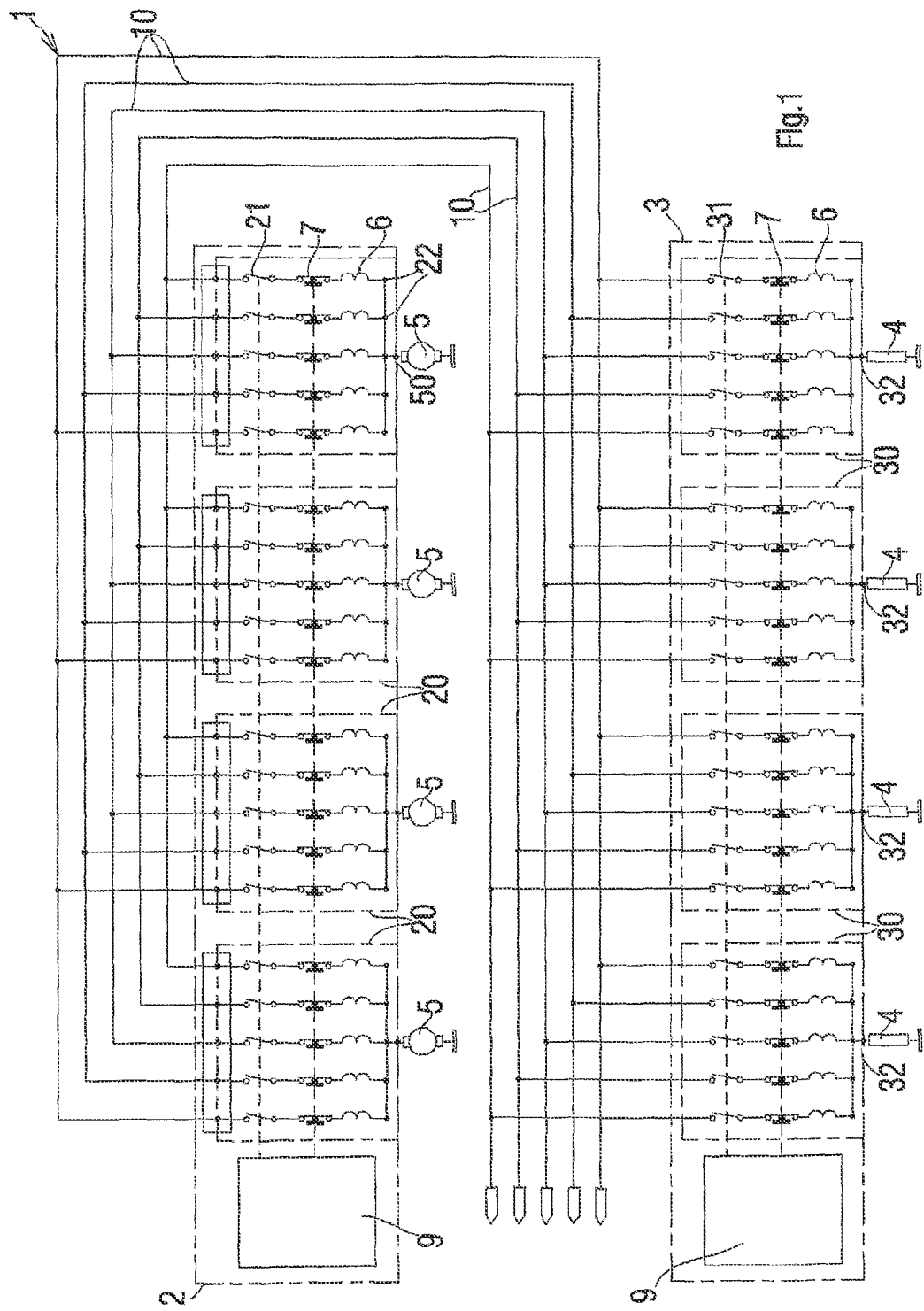
FIG. 1 shows a schematic view of the architecture according to the invention.

FIG. 1 shows an architecture according to the invention.

This architecture comprises a main electrical network 1, a primary distribution assembly 2 connected electrically to the main network 1 and at least one secondary distribution assembly 3 connected electrically to one part at least of the main electrical network, this secondary distribution assembly 3 being designed to supply electric power to several electrical loads 4.

The main electrical network 1 can appear physically in the form of electrical wires 10 appearing, for example, in the form of electrical cables with suitable insulation or even in the form of electrically conductive paths spaced apart from one another, formed on a flexible or rigid electrically insulated support.

Connection devices can be linked to this main electrical circuit 1 in order, for example, to allow the future connection of the secondary distribution assemblies 3.

The primary distribution assembly 1 can comprise several distinct electric power sources 5 of the single-phase or polyphase direct or alternating current type. With regard to an aircraft, these power sources 5 can be composed, in a non-limiting way, of generators activated by the motor or motors of the latter.

In the case of a polyphase generator, each phase is connected to a network that is electrically distinct from it or from those linked to the other phases.

Each electric power source 5 has at least one output terminal 50 on which electric power is available.

The primary distribution assembly is composed of one or more primary distribution subassemblies 20 connected to a dedicated electric power source 5.

At least one of the wires 10 of the main electrical network 1 can be connected to the ground or a neutral of one electric power source 5.

Each primary distribution subassembly 20 is composed of a selector means that is electrically connected to several electrical wires 10 of the electrical network 1 on the one hand and on the other hand to the dedicated electric power source 5, or to several sources that are compatible with one another or to ground or to the neutral. By this selector means 20 several independent electrical circuits are formed between the electric power source 5 and the linked electrical wires 10, these electrical circuits being able to be closed or opened individually by the selector means 20 such that the wire 10 connected to each circuit can be supplied or not with electric power.

The selector means 20 composed of each electrical distribution subassembly is composed of several relays 21, each forming a switch, comprising a common terminal 22 by which they are connected to the corresponding electric power source 5. Moreover each relay 21 is connected by a second terminal 23 to one of the wires 10 of the main electrical network 1.

Each secondary distribution assembly 3 comprises at least one selector means 30 connected to a single output terminal 32 to which a dedicated electrical load 4 is designed to be connected. This selector means is moreover connected to several wires 10 of the main electrical network, these wires being supplied by the same electric power source 5 or by electric power sources that are compatible with one another. These wires, as stated above, can be connected either to the neutral of one of the sources or to the ground.

This selector means 30 is designed to assure closing or opening of the electrical circuits established between the electrical output terminal 32 and the respective wires 10 of the main electrical network 1 in a dynamic manner.

It will be possible to supply electrical power to the load 4, for example, by closing one electrical circuit or more.

This selector means will likewise be able to establish, in case of failure, for example, of one of the linked wires 10, the supply of this load 4 from another wire 10 of the network 1. This switching can also be carried out, not to bypass an electrical failure, but to balance the currents, this balancing being carried out dynamically.

Each selector means 30 of each secondary distribution assembly 3 comprises several relays 31 connected to the connection terminal 32 of the load 4. Each relay 31 is moreover connected to one of the wires 10 of the main electrical network 1, the relays 31 of the same selector means 30 being connected to different electrical wires 10.

Each wire 10 of the main network is connected to at least one of the electric power sources 5 or even to the ground or to the neutral, via one of the relays 21 connected to this source, ground or neutral.

In the embodiment of FIG. 1, each wire 10 is connected to several electric power sources 5.

Likewise, each wire 10 of the main electrical network is connected to one of the relays 31 of at least one selector means 30 of the secondary distribution assembly 3. According to the preferred embodiment, each wire 10 is connected to one of the relays 31 of several selector means 30.

The different relays 21, 31 that are part of the selector means 20 or of selector means 30 will be remotely maneuverable independently of one another by a suitable actuation and control circuit 9, implementing essentially adapted information technology or electronic network management means.

This arrangement allows a dynamic management of the sources 5, for example it allows isolation of one of the sources 5 in case of failure of the latter and switching at least, the wires 10 that had been supplied previously by the failed source 5 onto another source 5.

It also allows a dynamic management of the currents and loads, their assignment, the supply current of a load 4 being able to be distributed over several wires 10 via several relays.

The relays will be, for example, of the type of those that can be driven by an electrical signal or by an optical signal.

At least one protection means 6 composed of a fuse element and a protection means 7 composed of a circuit breaker will be series connected to each relay. Advantageously the interruption component that the circuit breaker has will form the relay 31. This circuit breaker-relay assembly will be advantageously composed of an SSPC.

Figure 2:
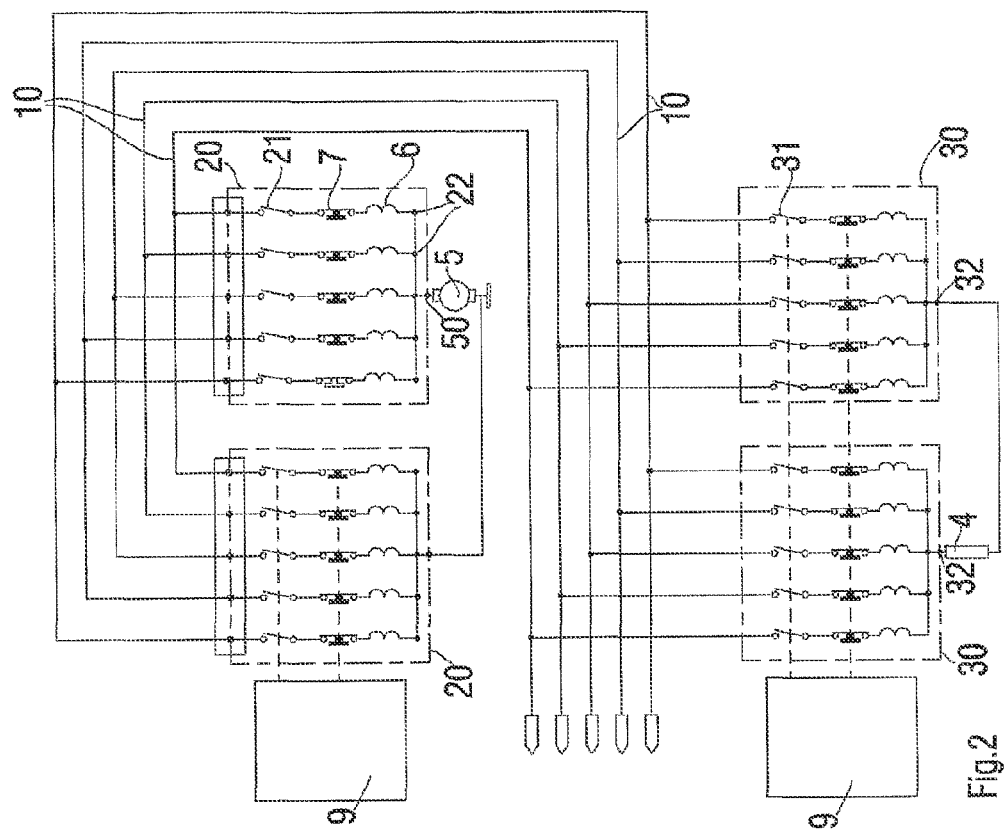
FIG. 2 shows a load connection mode allowing differential current measurements.
Figure 3:
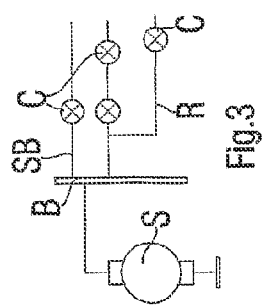
FIG. 3 shows schematically a known electrical network for an aircraft.

FIG. 2 shows a primary distribution subassembly 20 connected to the electrical ground of the system or to the neutral of an electric power source (case of a neutral insulated from the ground) and a secondary distribution assembly 30 connected to this primary distribution subassembly via several wires of the main electrical network. It is likewise noted that a load 4 is connected to this secondary distribution assembly 30 and that this load 4 is also connected to another secondary distribution assembly that, in this case of the figure, is connected to a power source via another primary distribution assembly.

This arrangement allows differential measurements of current to detect all current leakages to the ground (differential protection) or to lessen the negative electromagnetic effects.

The main electrical network will be monitored at the same time at the site of the overcurrents and by differential measurements between the sum of the primary currents and the sum of the secondary currents for each of the wires. Time correlation methods on the variations of currents and voltages will make it possible to be free of measurement errors and these arrangements as a whole as described will make it possible to detect serial and parallel electric arcs. Other devices based on measurements of voltages and currents and their variations at the site of the primary subassemblies and secondary assemblies will make it possible to precisely locate a fault in the network.

Advantageously, means for testing the electrical continuity and short circuits of the electrical connections from the sources 5 up to the loads 4 will be provided. These connections will be tested at regular intervals and will be isolated in case of a fault.

Means of testing the opening capacity of the circuit breakers linked to the same load by regular and sequenced opening of the circuit breakers will likewise be provided.

These various test functions will be managed by the network management software.

Advantageously, management of the circuit breakers will be performed by the software and the electronics that perform the other functions of network control and management.

Advantageously, the selector and circuit breaker means of the primary subassemblies and of the secondary distribution assemblies will be composed of segmental circuit breakers such as those described in the patent application for "Segmental circuit breakers" that was filed on this same date by the applicant.

The architecture as described, jointly with the transport of the electric power supplying the loads, can also be used for the transport of digital data; which is specific to reducing the importance of the networks assigned to this task.

It goes without saying that this invention can accommodate all arrangements and variants from the field of technical equivalents without, thereby, going outside the scope of this patent.

The invention claimed is:

1. An electrical network for confined environment designed to transport electric power from at least one electric power source (5) to several electrical loads (4):
   a) comprising a main electrical network (1) comprising several electric wires (10) that are electrically insulated from one another, which are able to distribute electric power between a primary distribution assembly (2) of at least one electric power source (5) and a secondary distribution assembly (3) to the plurality of loads (4);
   b) in which the primary distribution assembly (2) for each electric power source (5) comprises at least one primary distribution subassembly selector means (20), which selector means (20) comprises a plurality of switches (21), said switches comprise:
   a common terminal (22), common to all the switches of the selector means under consideration, designed to be connected to a terminal of the corresponding electric power source (5);
   each a second terminal (23) connected to one of the electrical wires (10) of the main electrical network;
   c) in which the secondary distribution assembly (3) comprises for each electrical load (4) a secondary distribution subassembly selector means (30), which selector means (30) comprises a plurality of switches (31), which switches comprise:
   a common terminal (32), common to all the switches of the selector means under consideration, designed to be connected to the corresponding electrical load (4);
   each a second terminal connected to one of the electrical wires (10) of the main electrical network;
   so that each electrical load (4) is in time, by actions on the switches (31) of the secondary distribution subassembly selector means (30), linked to said electrical load, to be supplied by one or more electrical wires (10) of the main network and so that any wire (10) of the main network (1) can be individually isolated from said network by actions on the switches (21, 31) of the selector means (20, 30).

2. The electrical network according to claim 1, wherein at least one means of protection (6, 7) against the electrical faults, such as electrical overcurrents, electrical overvoltages, electrical undervoltages, differential faults and serial or parallel electric arcs, is series connected to each switch (21, 31) of each selector means (20, 30).

3. The electrical network according to claim 2, designed to transport electric power from several electrical power sources (5) to several loads (4), wherein the switches (21) of each primary distribution subassembly (20) and each secondary distribution subassembly (30) are activated in the direction of opening or closing by remote control by a controller, taking into account the configuration of the loads, said controller assuring the dynamic balancing of the currents in the network between the electric power sources (5) and/or between the wires by switching of the loads and/or electric power sources onto the electrical wires (10) of the network.

4. The electrical network according to claim 2, wherein the protection means comprises a fuse element (6).

5. The electrical network according to claim 2, wherein the protection means comprises a circuit breaker (7).

6. The electrical network according to claim 1, wherein the terminal of the electric power source (5) to which a wire (10) of the main electrical network (1) will be connected via one of the switches (21) of a primary distribution subassembly selector means (20) is an output terminal (50) of said electric power source (5) or a neutral of said power source or an electrical system ground.

7. The electrical network according to claim 1, wherein each wire (10) of the main electrical network (1) is connected to one of the switches (31) of at least one of the secondary distribution subassembly selector means (30).

8. The electrical network according to claim 7, wherein each wire (10) of the main electrical network is connected to one of the switches (31) of several selector means (30).

9. The electrical network according claim 1, wherein it is likewise used for digital data transport.

10. The electrical network according to claim 3, wherein it comprises measurement means that can measure the voltage and current values at the site of each switch (21, 31) and wherein the controller based on the result of said measurements is able to detect an electrical fault and to act in response on the protection means.

11. The electrical network according to claim 10, wherein each switch (21, 31) and its means of protection (6, 7 against electrical faults are formed by a circuit breaker, preferably of the SSBC type.

12. An aircraft comprising an electrical network according to claim 1.

13. The electrical network according to claim 1, designed to transport electric power from several electrical power sources (5) to several loads (4), wherein the switches (21) of each primary distribution subassembly (20) and each secondary distribution subassembly (30) are activated in the direction of opening or closing by remote control by a controller, taking into account the configuration of the loads, said controller assuring the dynamic balancing of the currents in the network between the electric power sources (5) and/or between the wires by switching of the loads and/or electric power sources onto the electrical wires (10) of the network.

* * * * *